United States Patent
Konno et al.

(10) Patent No.: US 10,721,373 B2
(45) Date of Patent: Jul. 21, 2020

(54) IMAGE SENSING DEVICE, IMAGE READING DEVICE, IMAGE FORMING APPARATUS AND IMAGE SENSING METHOD

(71) Applicants: Yoshio Konno, Kanagawa (JP); Masamoto Nakazawa, Kanagawa (JP)

(72) Inventors: Yoshio Konno, Kanagawa (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/659,332

(22) Filed: Jul. 25, 2017

(65) Prior Publication Data
US 2017/0324883 A1    Nov. 9, 2017

Related U.S. Application Data

(62) Division of application No. 14/555,864, filed on Nov. 28, 2014, now Pat. No. 9,756,219.

(30) Foreign Application Priority Data

Dec. 11, 2013   (JP) .................................. 2013-256248

(51) Int. Cl.
*H04N 1/46*   (2006.01)
*H04N 1/48*   (2006.01)
(Continued)

(52) U.S. Cl.
CPC ........... *H04N 1/486* (2013.01); *H04N 5/3692* (2013.01); *H04N 5/3742* (2013.01); *H04N 9/045* (2013.01)

(58) Field of Classification Search
CPC .... H04N 1/486; H04N 5/3692; H04N 5/3742; H04N 9/045
(Continued)

(56) References Cited

U.S. PATENT DOCUMENTS 6,838,651 B1   1/2005   Mann
7,408,683 B2 *  8/2008   Sato ..................... H04N 1/1931
                                                          348/250

(Continued)

FOREIGN PATENT DOCUMENTS

JP        11-127442         5/1999
JP        11-136466 A       5/1999
(Continued)

OTHER PUBLICATIONS

U.S. Appl. No. 14/199,534, filed Sep. 29, 2014.
(Continued)

*Primary Examiner* — Cheukfan Lee
(74) *Attorney, Agent, or Firm* — Oblon, McClelland, Maier & Neustadt, L.L.P.

(57) ABSTRACT

An image sensing device includes a plurality of photoelectric conversion elements arranged in one direction for each color of received light, and an analog-digital (AD) convertor that performs analog-digital conversion for each pixel group configured by a plurality of photoelectric conversion elements selected from the photoelectric conversion elements. The AD converter is disposed in a position adjacent to each of the photoelectric conversion elements configuring the pixel group.

16 Claims, 19 Drawing Sheets

(51) Int. Cl.
*H04N 9/04* (2006.01)
*H04N 5/369* (2011.01)
*H04N 5/374* (2011.01)

(58) Field of Classification Search
USPC .......... 358/512–514, 482, 483, 445, 443; 250/208.1
See application file for complete search history.

(56) References Cited

U.S. PATENT DOCUMENTS

| | | | |
|---|---|---|---|
| 7,426,065 B2 * | 9/2008 | Haas | H04N 1/028 250/208.1 |
| 9,100,533 B2 | 8/2015 | Nakazawa | |
| 2001/0000661 A1 * | 5/2001 | Miyamoto | G06F 7/5013 341/56 |
| 2007/0188638 A1 | 8/2007 | Nakazawa et al. | |
| 2008/0252787 A1 | 10/2008 | Nakazawa et al. | |
| 2009/0074330 A1 * | 3/2009 | Hamada | H04N 1/193 382/321 |
| 2009/0174588 A1 | 7/2009 | Muenter | |
| 2010/0027061 A1 | 2/2010 | Nakazawa | |
| 2010/0171998 A1 | 7/2010 | Nakazawa | |
| 2011/0026083 A1 | 2/2011 | Nakazawa | |
| 2011/0051201 A1 | 3/2011 | Hashimoto et al. | |
| 2011/0063488 A1 | 3/2011 | Nakazawa | |
| 2012/0008173 A1 | 1/2012 | Konno et al. | |
| 2012/0092732 A1 | 4/2012 | Nakazawa | |
| 2012/0224205 A1 | 9/2012 | Nakazawa | |
| 2013/0063792 A1 | 3/2013 | Nakazawa | |
| 2014/0029065 A1 | 1/2014 | Nakazawa | |
| 2014/0204427 A1 | 7/2014 | Nakazawa | |
| 2014/0204432 A1 | 7/2014 | Hashimoto et al. | |
| 2014/0211273 A1 | 7/2014 | Konno et al. | |
| 2015/0222790 A1 | 8/2015 | Asaba | |

FOREIGN PATENT DOCUMENTS

| | | | |
|---|---|---|---|
| JP | 2003-163796 A | | 6/2003 |
| JP | 2007-60350 A | | 3/2007 |
| JP | 2009-60545 A | | 3/2009 |
| JP | 2009060545 A | * | 3/2009 |
| JP | 2011-239261 | | 11/2011 |
| JP | 5017182 | | 6/2012 |
| JP | 2014-039151 | | 2/2014 |
| WO | WO 2013/084406 A1 | | 6/2013 |

OTHER PUBLICATIONS

U.S. Appl. No. 14/482,515, filed Sep. 10, 2014.
U.S. Appl. No. 14/301,488, filed Jun. 11, 2014.
Office Action dated Dec. 4, 2018 in Japanese Patent Application No. 2017-196860.

* cited by examiner

IMAGE SENSING DEVICE, IMAGE READING DEVICE, IMAGE FORMING APPARATUS AND IMAGE SENSING METHOD

CROSS-REFERENCE TO RELATED APPLICATIONS

This application is a divisional of U.S. application Ser. No. 14/555,864, filed Nov. 28, 2014, and is based upon and claims the benefit of priority from prior Japanese Patent Application No. 2013-256248, filed Dec. 11, 2013, the entire contents of each of which are incorporated herein by reference.

BACKGROUND OF THE INVENTION

1. Field of the Invention

The present invention relates to an image sensing device, an image reading device, an image forming apparatus and an image sensing method.

2. Description of the Related Art

Charge-coupled device (CCD) image sensors have been used as a photoelectric conversion device for a scanner that reads an image in many cases. However, because of an increasing demand for low power consumption, complementary metal-oxide-semiconductor (CMOS) linear sensors are gaining more attention. A CMOS linear sensor converts incident light into electric charge by using photodiodes as in the case of a CCD image sensor. The CCD image sensor converts electric charge transferred by a shift register into voltage at a charge detector. The CMOS linear sensor converts electric charge into voltage signals at charge detectors provided for respective pixels and outputs the voltage signals via switches. By this configuration, the CMOS linear sensor consumes less power than the CCD image sensor.

The conventional CMOS linear sensors have a long analog bus connecting all the pixels to transfer analog image signals through the analog bus. Thus, wire resistance and wire capacitance are so large that the conventional CMOS linear sensors cannot achieve enhanced speed.

Japanese Patent Application Laid-open No. 2009-296544 describes sensors that scan three divided blocks, and each block is scanned three times to scan a whole line. The sensors simultaneously scan the divided blocks or a first block, a second block, and a third block in different colors in the first scan, the second scan, and the third scan.

However, the conventional CMOS linear sensor cannot achieve enhanced speed because of the difficulty in reducing wire resistance or wire capacitance along the analog bus.

Therefore, it is desirable to provide an image sensing device, an image reading device, an image forming apparatus, and an image sensing method that can achieve high-speed image reading.

SUMMARY OF THE INVENTION

It is an object of the present invention to at least partially solve the problems in the conventional technology.

According to an aspect of the present invention, there is provided an image sensing device including: a plurality of photoelectric conversion elements arranged in one direction for each color of received light; and an analog-digital (AD) converter that performs analog-digital conversion for each pixel group configured by a plurality of photoelectric conversion elements selected from the photoelectric conversion elements, the AD converter being disposed in a position adjacent to each of the photoelectric conversion elements configuring the pixel group.

According to another aspect of the present invention, there is provided an image sensing method performed by an image sensing device including a plurality of photoelectric conversion elements arranged in one direction for each color of received light, the method including performing, by an analog-digital (AD) converter, analog-digital conversion for each pixel group configured by a plurality of photoelectric conversion elements selected from the photoelectric conversion elements, the AD converter being disposed in a position adjacent to each of the photoelectric conversion elements configuring the pixel group.

According to still another aspect of the present invention, there is provided an image sensing device including: a plurality of photoelectric conversion means arranged in one direction for each color of received light; and an analog-digital (AD) conversion means for performing analog-digital conversion for each pixel group configured by a plurality of photoelectric conversion means selected from the plurality of photoelectric conversion means, the AD conversion means being disposed in a position adjacent to each of the plurality of photoelectric conversion means configuring the pixel group.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
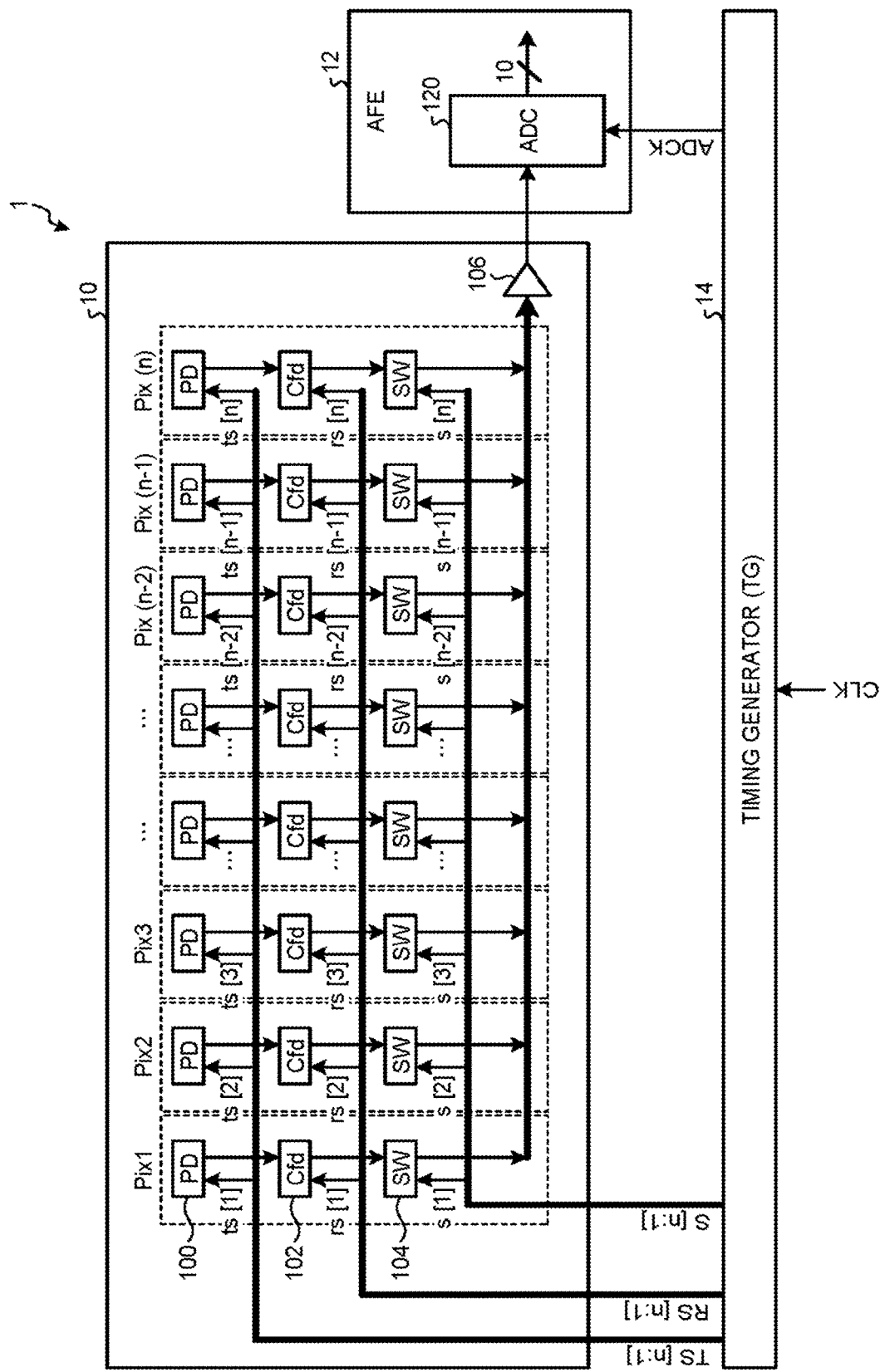
FIG. 1 is a diagram illustrating an outline of an image reading device.

Described first is the background of the present invention. FIG. 1 is a diagram illustrating an outline of an image reading device 1. The image reading device 1 includes a CMOS linear sensor 10, an analog front end (AFE) 12, and a timing generator (TG) 14.

The CMOS linear sensor 10 includes n pixels each including a photodiode (PD: photoelectric conversion element) 100, a charge detector (Cfd) 102, and a switch (SW) 104, and outputs image signals via an output buffer 106. The PD 100 converts reflected light (incident light) from, for example, a document into electric charge. The charge detector 102 convers the electric charge accumulated in the PD 100 by the photoelectric conversion into a voltage signal. An image signal converted into a voltage signal is input to an analog bus via the switch 104 and is output from the output buffer 106.

Specifically, the switches 104 are sequentially turned on from the first pixel to the nth pixel to output image signals of the respective pixels. The CMOS linear sensor 10 contains, for example, approximately 7000 pixels (n≈7000) to read an A3 document. The following description assumes n=7000.

Drive signals (S) that drive the switches 104 are turned on once in one line period. Because the drive signals cannot activate a plurality of pixels at the same time, the drive signals activate the respective pixels at slightly different timings. in other words, a signal (S[7000:1]) that drives each switch 104 is asserted once every pixel period in one line period, and the number of signals is equal to the number of pixels.

In the same manner, a signal (TS[7000:1]) that transfers the electric charge accumulated in the PD 100 to the charge detector 102, and a signal (RS[7000:1]) that resets the charge detector 102 are asserted once every pixel period in one line period, and the number of signals is equal to the number of pixels.

In FIG. 1, only one pixel each is illustrated in Pixl to Pix(n) that are pixel positions on a readout subject. To output electric signals in three RGB colors by converting incident light using filters in the three RGB colors, pixels in the three colors (approximately 7000 pixels×three colors) are arranged in arrays, each row of which contains pixels in the same color.

The AFE 12 includes, for example, an analog-digital (AD) converter (ADC) 120, and converts analog image signals output from the CMOS linear sensor 10 into digital image signals. The AFE 12 may include a high-speed serial signal converter (for example, low-voltage differential signaling (LVDS) or V-by-One HS) that transfers the converted digital image signals to an image processing unit at the following stage. The timing generator 14 outputs, for example, control signals that control the CMOS linear sensor 10 and signals that control the AFE 12.

The AFE 12 and the timing generator 14 may be configured in one chip, or the CMOS linear sensor 10, the AFE 12, and the timing generator 14 may be configured in one chip. The CMOS linear sensor 10 may include larger switches 104 provided for respective pixels to achieve high-speed drive, and may include a broader analog bus to reduce the impedance and prevent signal degradation due to the high-speed drive. In this case, however, loads on the CMOS linear sensor 10 are inevitably increased caused by parasitic capacitance in the switches 104 and wire capacitance in the analog bus, which may result in preventing the high-speed drive.

Figure 2:
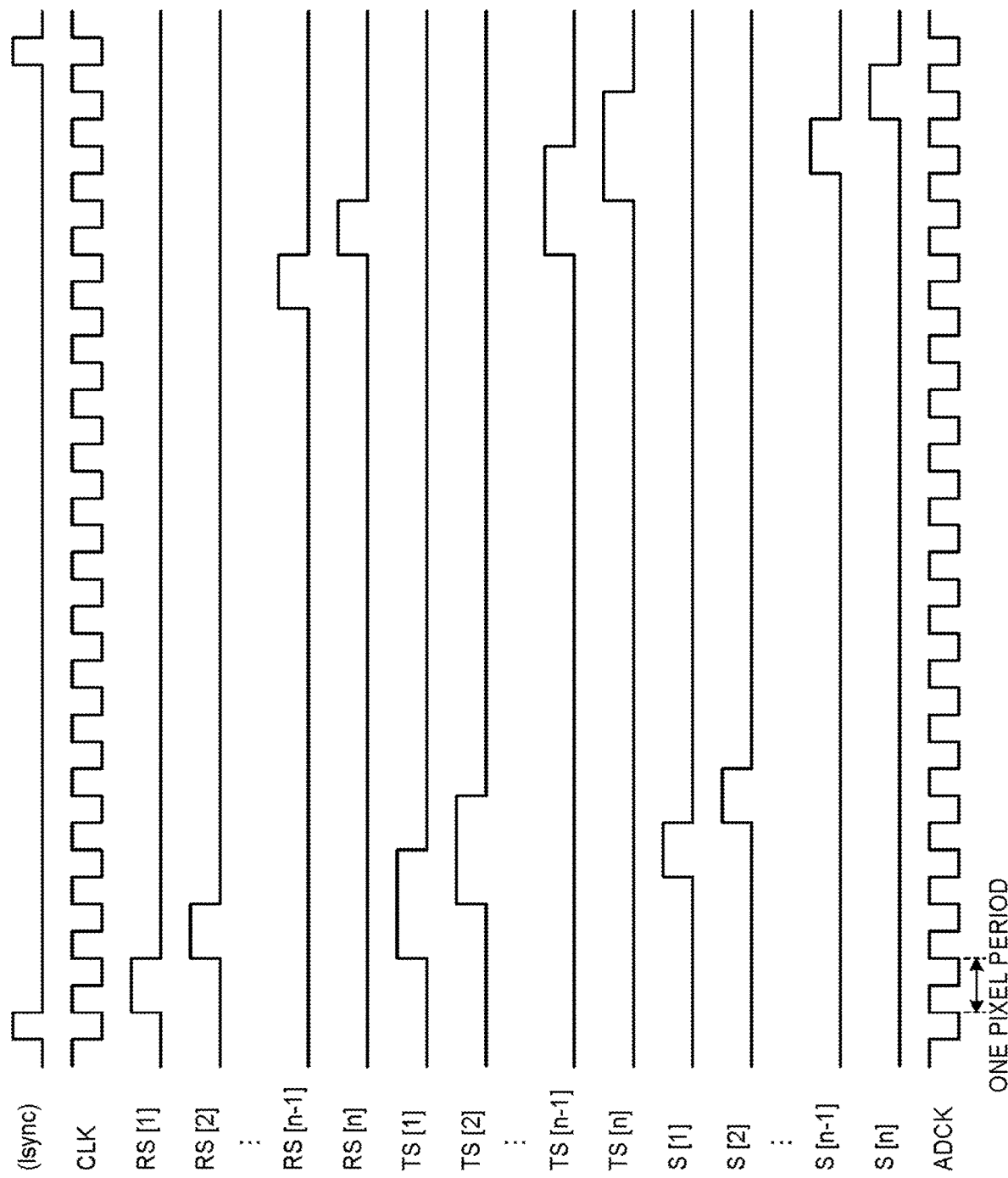
FIG. 2 is a timing chart illustrating operations for driving a CMOS linear sensor illustrated in FIG. 1.

FIG. 2 is a timing chart illustrating operations for driving the CMOS linear sensor 10 illustrated in FIG. 1. Drive signals for the CMOS linear sensor 10 are generated by the timing generator 14 by using a reference clock (CLK).

The timing generator 14 turns on a reset signal (RS) before starting on a line (before starting reading operation on each line). The RS resets electric charge in the charge detector 102. The reset state of the charge detector 102 is cancelled (off) during a reading period in which the charge detector 102 reads a pixel signal.

The timing generator 14 turns on a transfer signal (TS) to transfer the electric charge in the PD 100 to the charge detector 102 while the reset state of the charge detector 102 remains cancelled. The charge detector 102 converts the electric charge into voltage.

Subsequently, the timing generator 14 turns on a switch control signal (S) that controls a switch 104 to send the image signal converted into a voltage signal to the analog bus. Outputs from all the pixels are connected to the analog bus. One selected pixel is connected to the analog bus at a certain timing while the other pixels are disconnected from the analog bus by the switches 104. All the pixel signals in the CMOS linear sensor 10 pass a common analog bus as described above.

The image signal output to the analog bus is output to the outside via the output buffer 106. The timing generator 14 turns off the switch control signal (S) to turn off the switch 104, and the process proceeds to the next pixel. The timing generator 14 continues a series of processes described above until all the pixel signals are output. Thus, each timing at which TS[n], RS[n], and S[n] are turned on is different by one pixel period, and the series of processes are repeated approximately 7000 times in one line period. The CMOS linear sensor 10 configured to output image signals in the three RGB colors includes three analog buses for the three RGB colors.

lsync is a line synchronization signal indicating a period for scanning one main scanning line of image data. The image reading device 1 sequentially converts, by the AFE 12, analog image data output from the CMOS linear sensor 10 into digital image data, such as high-speed serial signals, and outputs the digital image data to the following stage.

The above-described processes are performed on all the pixels of the CMOS linear sensor 10, and the timing generator 14 drives the pixels at a pixel frequency at several megahertz to dozens of megahertz. The CMOS linear sensor 10 drives operations of one clock of the pixel frequency 7000 times (drives the operations using 7000 signals). In order to operate the CMOS linear sensor 10 faster, impedance needs to be reduced by increasing the size of the switches 104 to prevent the distortion of a signal waveform, and the analog bus needs to be widened that transfers the analog signals output from the 7000 pixels. When, however, the size of the switches 104 is increased to achieve high-speed operation, parasitic capacitance increases. When the analog bus is widened, wire capacitance increases. This configuration results in the weakening of the signal waveform, thereby preventing the high-speed operation.

First Embodiment

Figure 3:
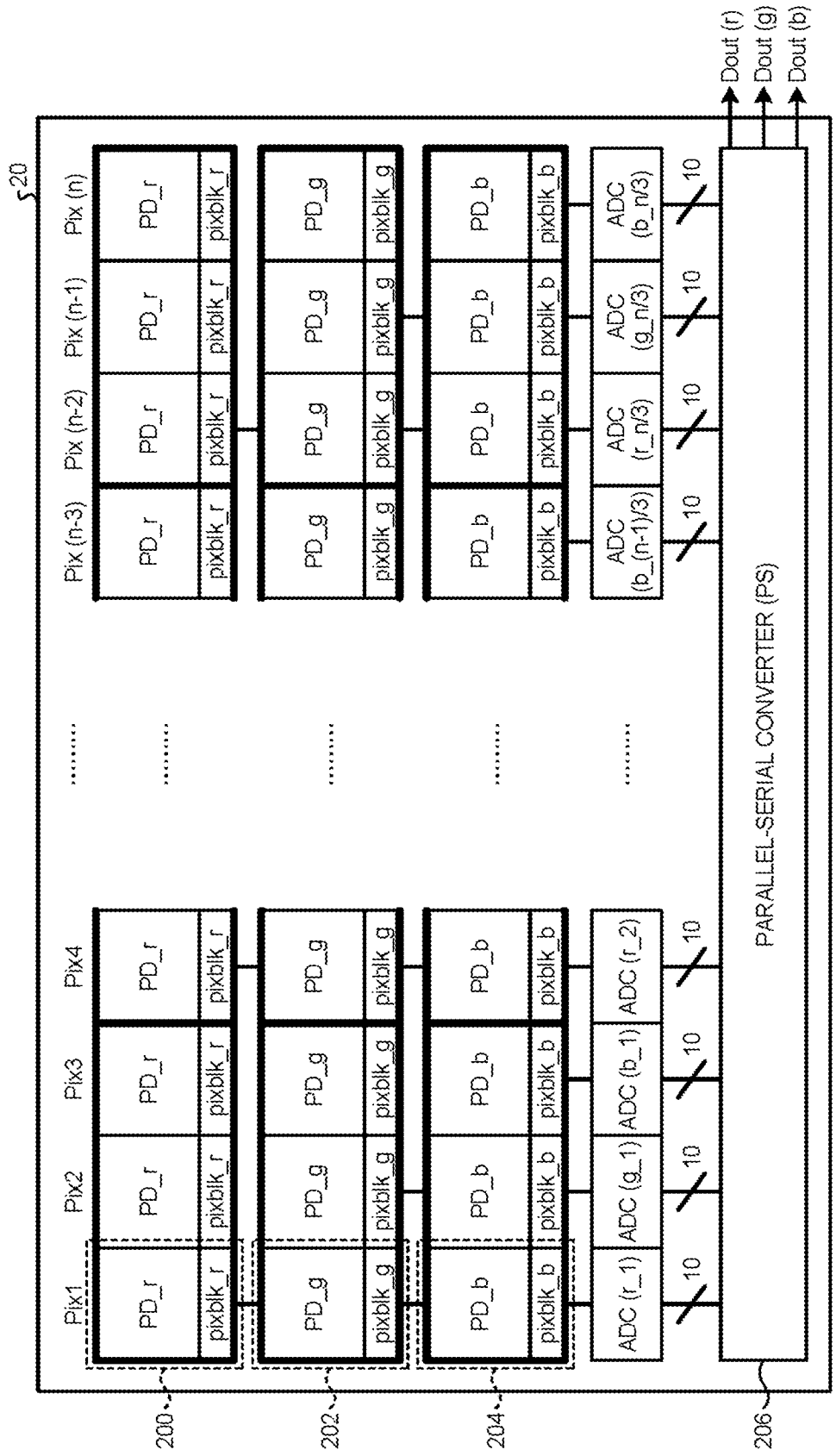
FIG. 3 is a diagram illustrating an example of a configuration outline of an image sensing device according to a first embodiment of the present invention.

Described next is an image sensing device according to a first embodiment of the present invention. FIG. 3 is a diagram illustrating an example of a configuration outline of an image sensing device 20 according to the first embodiment. The image sensing device 20 is a CMOS color liner sensor configured to read, for example, Pixl to Pix(n) that are pixel positions on a subject in the three RGB colors, and includes n pixels (pixel units) in each color arranged in one direction. In the following description, the same reference signs are given to substantially the same constituent elements of each image sensing device.

A pixel 200 provided with an R filter (not illustrated) includes a photodiode (PD_r) and a pixel block (pixblk_r). A pixel 202 provided with a G filter (not illustrated) includes a photodiode (PD_g) and a pixel block (pixblk_g). A pixel 204 provided with a B filter (not illustrated) includes a photodiode (PD_b) and a pixel block (pixblk_b). Each pixel block includes a charge detector (Cfd) (not illustrated) that converts electric charge accumulated in the photodiode (photoelectric conversion element) into voltage, and a circuit that drives the Cfd. In the following description, the photodiode may be referred to as PD_*, and the pixel block may be referred to as pixblk_*. The asterisk (*) indicates any one of the colors r, g, and b.

The image sensing device 20 includes n pixels 200, n pixels 202, n pixels 204, and n AD converters (ADC). The n ADCs perform analog-digital (A/D) conversion to output image signals to a parallel-serial converter (PS) 206, and the parallel-serial converter (PS) 206 outputs serial digital signals in each color.

For example, the image sensing device 20 accumulates reflected light (incident light) from a document in the PD_* as electric charge, and converts the accumulated electric charge into voltage at the Cfd of the pixblk_ *. The image sensing device 20 converts analog image signals output from pixel groups each composed of a plurality of pixels into digital image signals at common ADCs adjacent to the respective pixel groups. The phrase "adjacent to the respective pixel groups" indicates, for example, a distance in which signals can be transmitted within a certain time period, that is, a distance in which each pixel constituting a pixel group can transmit a signal to the ADC within a time period without falling behind the other pixels by a couple of digits (or by more than double digits).

Each pixel group of the image sensing device 20 is composed of three pixels (pixels surrounded by the black bold line in FIG. 3) in the same color adjacent to each other arranged in a direction (main-scanning direction) in which pixels in each color are arranged, and each pixel group uses one ADC (common ADC). In other words, the image sensing device 20 immediately converts an analog signal output from the Cfd of a pixblk_ * into a digital signal at an adjacent ADC. With this configuration, the length of the analog bus can be far shorter, thereby enabling high-speed operation.

All the ADCs in the image sensing device 20 simultaneously convert analog image signals output from every pixel of all the pixel groups into digital image signals. Image data of parallel digital signals output from the ADCs for the respective pixel groups in the image sensing device 20 is converted into serial data (Dout(r), Dout(g), Dout(b)) at the parallel-serial converter 206, and the serial data is output to the following stage.

The number of pixels constituting (selected as) each pixel group of the image sensing device 20 is not limited to three. For example, the number of pixels constituting each pixel group may be six (two pixels, an EVEN pixel and an ODD pixel, for each RGB color) to use one ADC in common as in the case in which one line is divided into two, even pixels and odd pixels, to output image data.

Figure 4:
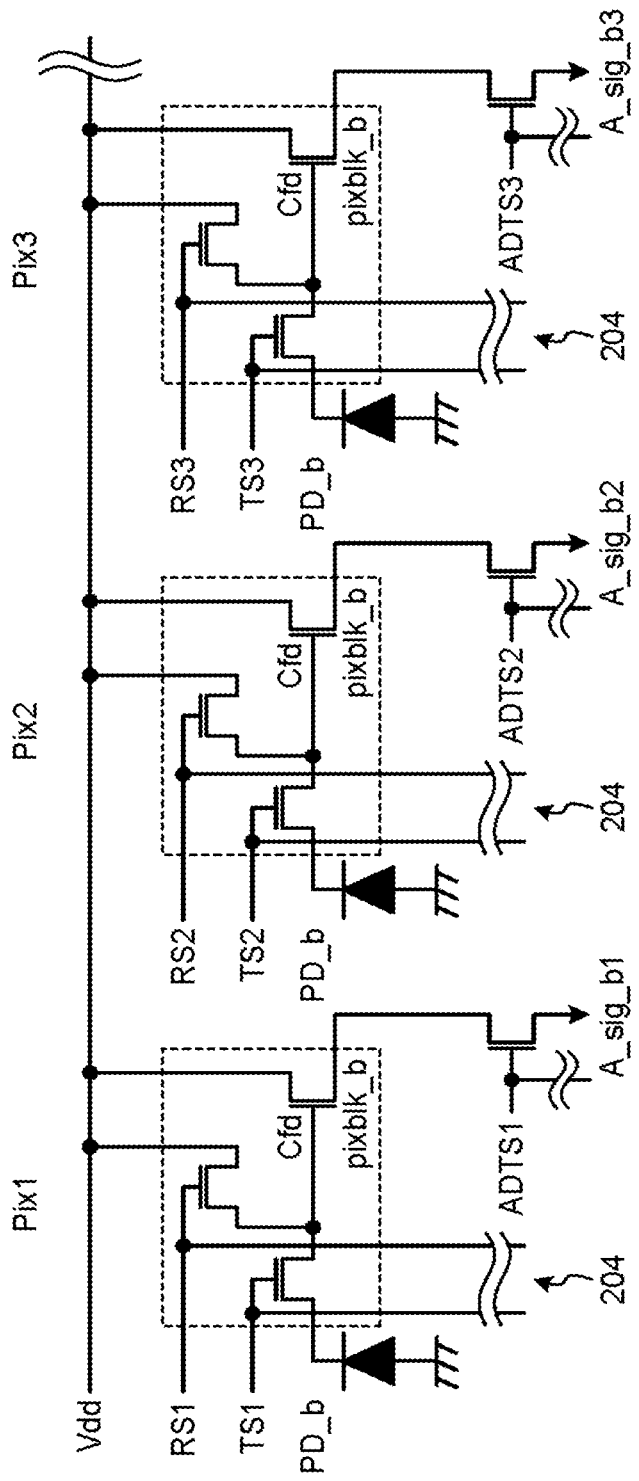
FIG. 4 is a diagram illustrating a configuration of pixels illustrated in FIG. 3.

FIG. 4 is a diagram illustrating a configuration of pixels illustrated in FIG. 3 While FIG. 3 illustrates an example in which each pixel group is composed of three pixels in the same color and parallel processing is performed on the pixel groups, FIG. 4 specifically illustrates a pixel group in the B color in the image sensing device 20.

Vdd is power supply voltage supplied to the image sensing device 20, and is used as an output reference potential. The PD_bs accumulate electric charge in accordance with the intensity of incident light. Reset signals (RS1, RS2, RS3) reset the respective charge detectors (Cfds) that convert the electric charge accumulated in the PD_bs into voltage. Transfer signals (TS1, TS2, TS3) transfer the electric charge accumulated in the PD_bs to the Cfds at which the electric charge is converted into voltage.

In FIG. 4, the areas including the corresponding Cfd and defined by the dotted line are pixel circuits (pixblk_bs). Analog signals (A_sig_b1, A_sig_b2, A_sig_b3) converted into voltage at the pixblk_bs are transferred to an ADC adjacent to the pixels 204 (PD_bs and pixblk_bs) in accordance with transfer signals (ADTS1, ADTS2, ADTS3).

In the image sensing device 20, each signal (RS, TS, ADTS) is input to all the pixel groups in parallel. The signals (RS, TS, ADTS) are used in common among the pixel groups.

Figure 5:
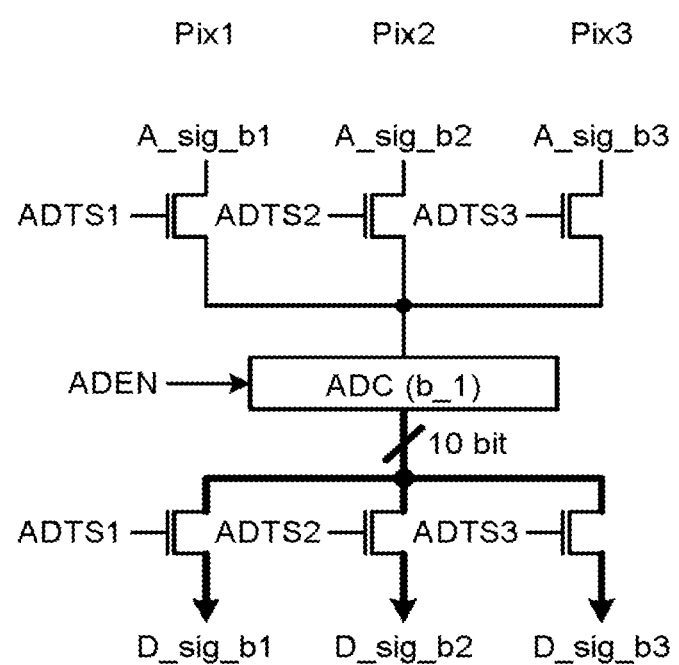
FIG. 5 is a diagram illustrating the periphery of an analog-digital (AD) converter that converts analog signals output from the pixels illustrated in FIG. 3 into digital signals.

FIG. 5 is a diagram illustrating the periphery of an AD converter (ADC) that converts analog signals output from the pixels illustrated in FIG. 3 into digital signals. The analog signals (A_sig_b1, A_sig_b2, A_sig_b3) output from the pixels 204 are transferred to the ADC in accordance with three transfer signals (ADTS1, ADTS2, ADTS3) with different transfer timings.

The analog image signals transferred to the ADC are converted into digital image signals pixel by pixel while a signal ADEN that enables the ADC is high, and the digital signals (D_sig_b1, D_sig_b2, D_sig_b3) are output to the parallel-serial converter 206 while the transfer signals (ADTS1, ADTS2, ADTS3) are high The image sensing device 20 can simultaneously transfer the analog signals A_sig_b1, A_sig_b2, and A_sig_b3 to the ADCs when analog memories (storage units) are provided at the preceding stages of the respective ADCs. This configuration enables the image sensing device 20 to read the same position (pixel) on a subject in each color at the same time (global shutter).

Figure 6:
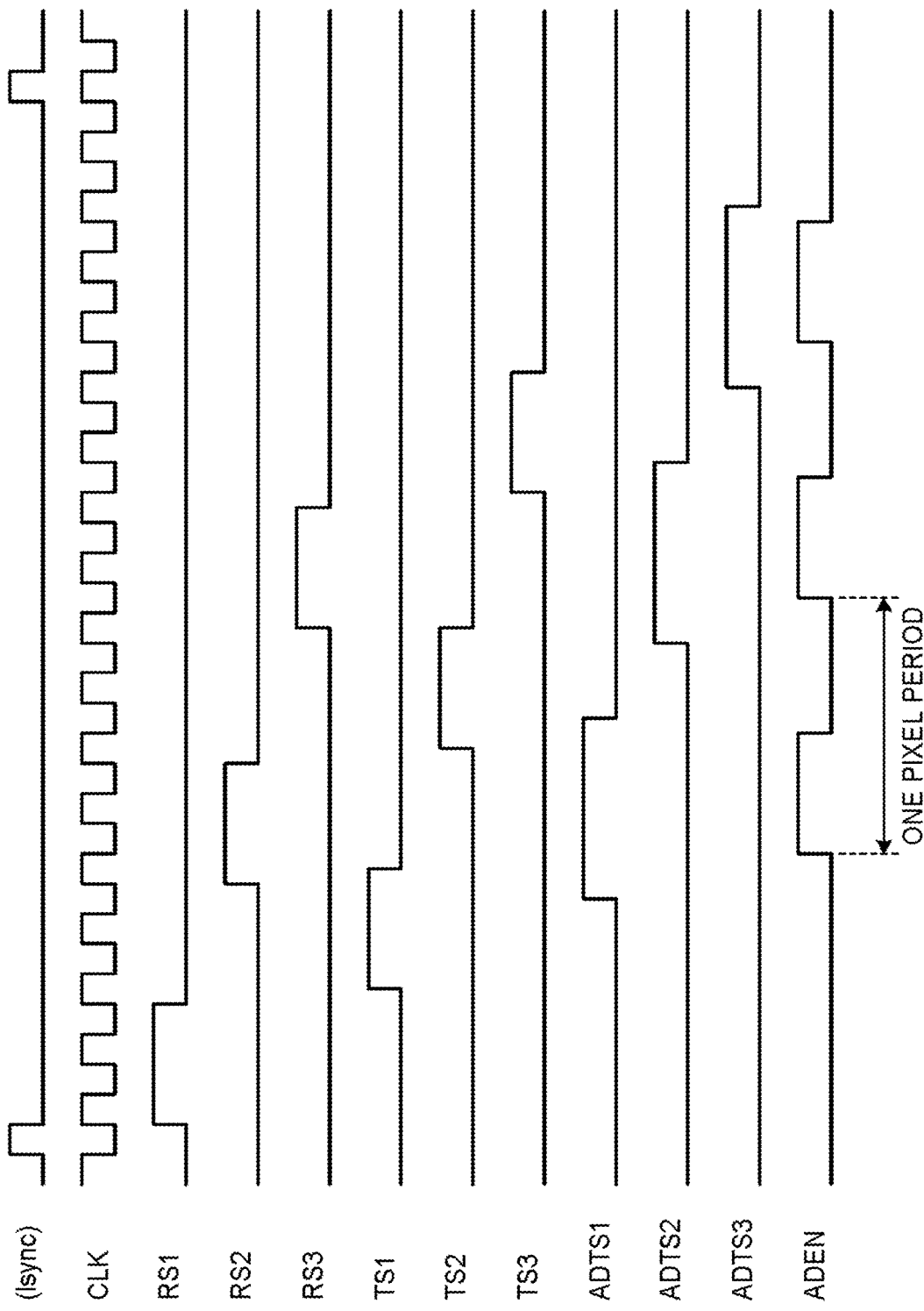
FIG. 6 is a timing chart illustrating operations for driving the image sensing device.

FIG. 6 is a timing chart illustrating operations for driving the image sensing device 20. Drive signals for the image sensing device 20 are generated by, for example, the timing generator 14 by using the reference clock (CLK) as in the case of the CMOS linear sensor 10 illustrated in FIG. 2.

lsync is a line synchronization signal indicating one line period in the main-scanning direction of image data.

Because each pixel group of the image sensing device 20 is composed of three pixels, the timing generator 14 first turns on RS1 to reset the corresponding Cfd before starting on a line. The timing generator 14 then turns on RS2 at a timing different from the timing at which RS1 is turned on, and turns on RS3 at a timing different from the timings at which RS1 and RS2 are turned on, thereby resetting the three Cfds in the pixel group.

The timing generator 14 sequentially turns on TS1 to TS3 at different timings after resetting the Cfds to transfer the electric charge accumulated in the PD_* to the Cfds. The timing generator 14 then sequentially turns on ADTS1 to ADTS3 at different timings to input, to the ADCs, analog signals obtained by converting electric charge into voltage at the Cfds.

The image sensing device 20 performs the above-described operations at the same time for each of the pixel groups. Each ADC repeats A/D conversion, for example, approximately ten times to output 10 bit data while the ADEN is high Image signals converted into digital signals are converted from parallel digital signals to serial digital signals at the parallel-serial converter 206 and are output to an image processing unit (not illustrated) at the following stage. The number of times the above-described A/D conversion is performed is not limited to ten, but may be changed depending on the volume of data necessary for the image data received by the image processing unit at the following stage.

Figure 7:
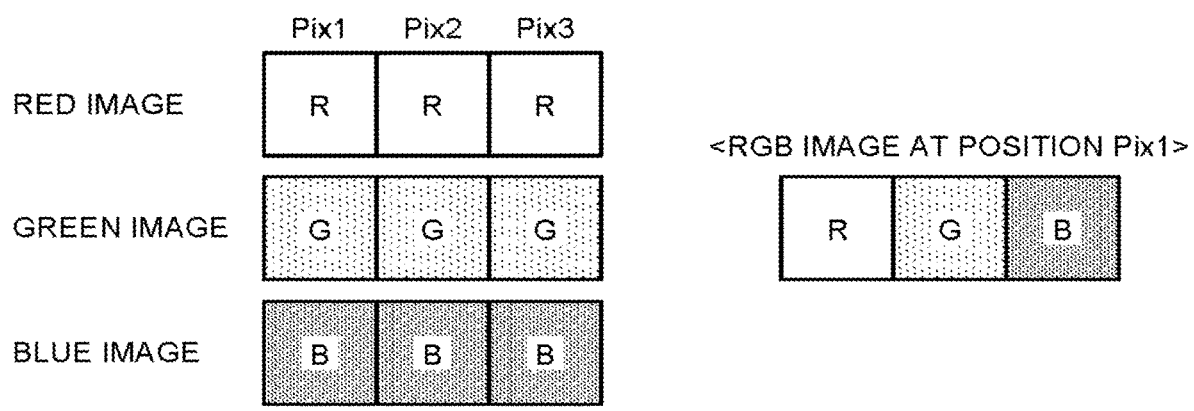
FIG. 7 is a schematic diagram illustrating colors of an image read and reproduced by the image sensing device.

FIG. 7 is a schematic diagram illustrating the colors of an image read and reproduced by the image sensing device 20. As described above, each pixel group of the image sensing device 20 is composed of three pixels in the same color adjacent to each other arranged in a direction in which pixels in each color are arranged, and uses one ADC in common. This configuration enables the image sensing device 20 to perform high-speed image reading. This configuration may, however, fail to reproduce the color of a read image with high fidelity.

The image sensing device 20 includes one common processing circuit (assuming that the processing circuit is the ADC) for each pixel group to achieve high-speed image reading and performs parallel processing. Each pixel group in the image sensing device 20 is composed of a plurality of pixels in the same color arranged in an array in the main-scanning direction. This configuration causes fixed pattern noise when individual ADCs have different characteristics.

The fixed pattern noise occurring on a black part (dark part) and on a white part (bright part) of a read image can be compensated by the black shading correction method and the white shading correction method. When, however, the fixed pattern noise is attributable to a difference in linearity between ADCs, the effects of the fixed pattern noise appear in half tone. Thus, it is difficult to compensate all the effects of the fixed pattern noise by the black shading correction method and the white shading correction method described above.

When the image sensing device 20 is used to read an image, the pixels 200, the pixels 202, and the pixels 204 can acquire image data at the same positions in the main-scanning direction (a pixel at the same position on the subject such as a pixel at the position of Pix1) by physically moving a subject or the image sensing device 20 itself. In this case, when a gray document (half tone between black and white) having a uniform density among the RGB colors is read, no hue difference occurs among three pixels of R, three pixels of G, or three pixels of B. This is because the pixels in each color use the same ADC in common and thus they have the same (common) linearity.

However, uneven color or false color appears among the RGB colors at the same pixel position, that is, appears on an image obtained by synthesizing the RGB colors (for example, an image at the position of Pix1 in the main-scanning direction) because the three ADCs have different characteristics. If the ADCs have the same linearity, uneven color or false color does not appear. However, as long as each ADC is a physically different circuit, a difference in linearity can occur between the ADCs. The linearity can be compensated pixel by pixel, but a large compensation circuit is required for this purpose and the control of this circuit is complicated.

Second Embodiment

Figure 8:
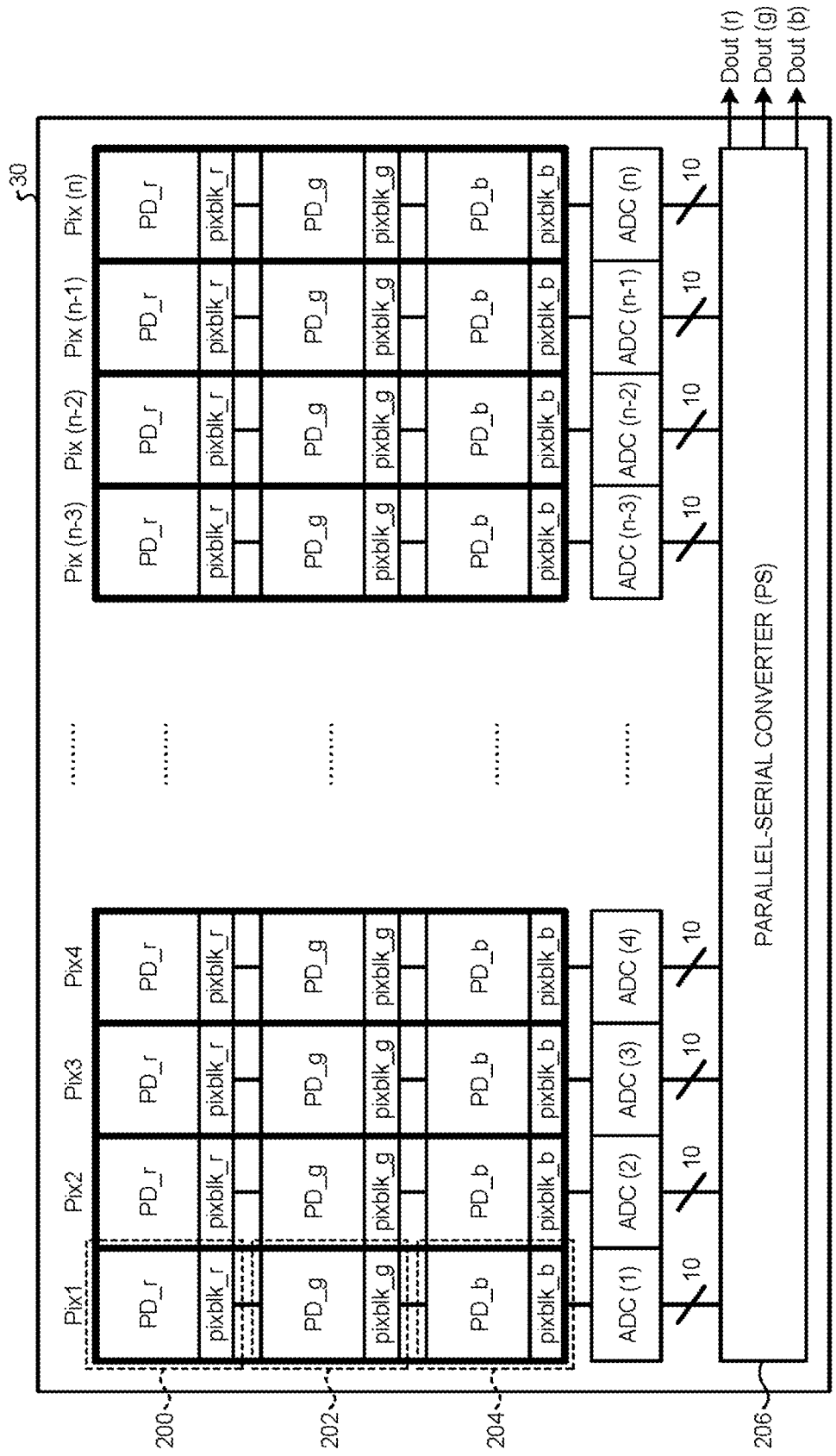
FIG. 8 is a diagram illustrating an example of a configuration outline of an image sensing device according to a second embodiment of the present invention.

Described next is an image sensing device according to a second embodiment of the present invention. FIG. 8 is a diagram illustrating an example of a configuration outline of an image sensing device 30 according to the second embodiment. The image sensing device 30 is a CMOS color linear sensor configured to read, for example, Pix1 to Pix(n) that are pixel positions on a subject in the three RGB colors, and includes n pixels (pixel units) in each color arranged in one direction.

Each pixel group of the image sensing device 20 illustrated in FIG. 3 is composed of three pixels in the same color adjacent to each other arranged in a direction in which pixels in each color are arranged. The pixel groups of the image sensing device 30 are configured differently from those of the image sensing device 20. Each pixel group of the image sensing device 30 is composed of pixels in all colors (pixels surrounded by the black bold line in FIG. 8) configured to read a subject at the same position in a direction (main-scanning direction) in which pixels in each color are arranged, and uses one ADC (common ADC). In other words, each pixel group of the image sensing device 30 is composed of a plurality of pixels in all colors (three pixels in the RGB colors in the second embodiment) configured to read a subject at the same position by physically moving the subject or the image sensing device 30 itself. The number of pixels constituting one pixel group of the image sensing device 30 is not limited to three. For example, the number of pixels constituting one pixel group of the image sensing device 30 may be six (three pixels in the RGB colors×2).

Figure 9:
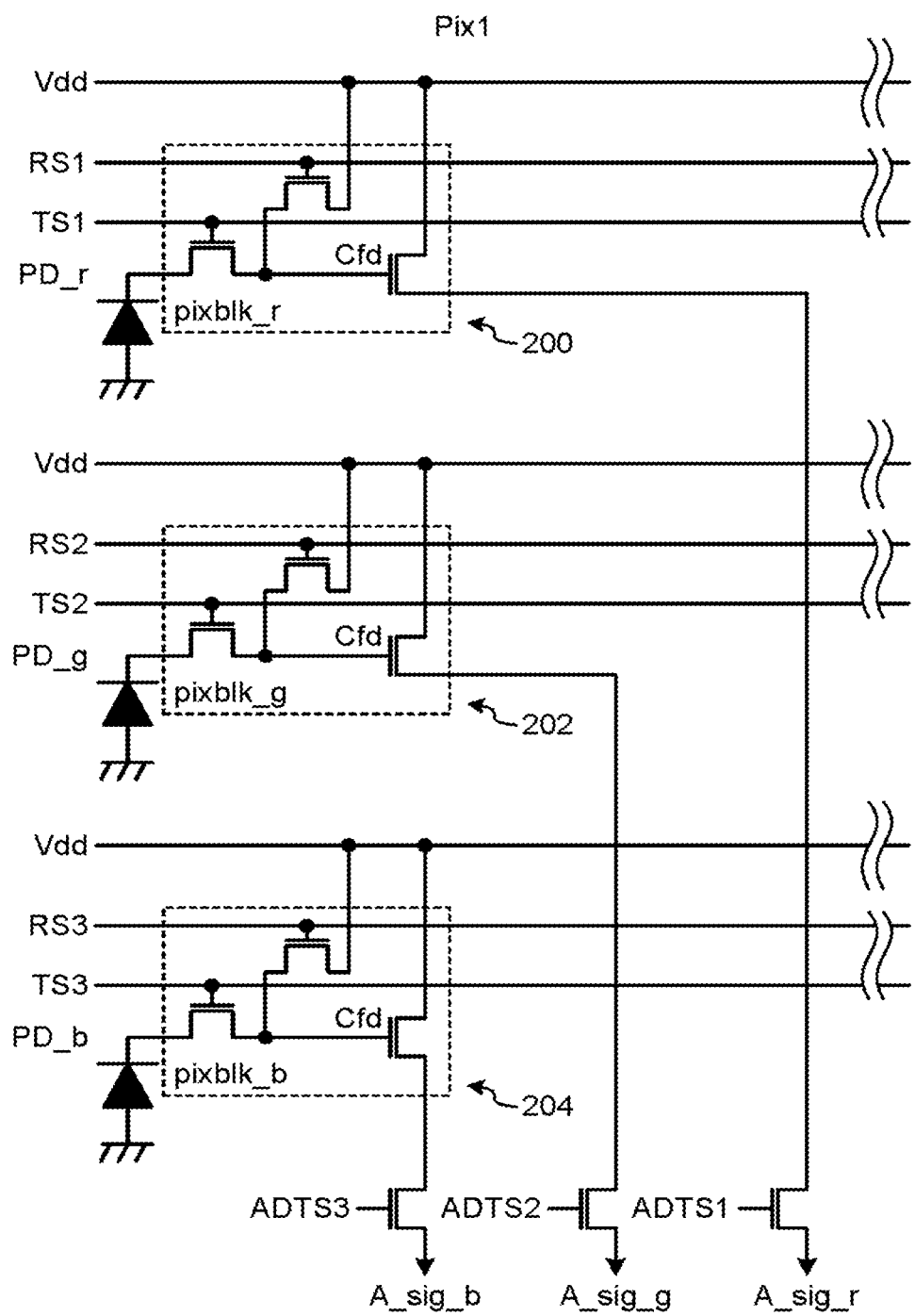
FIG. 9 is a diagram illustrating a configuration of pixels illustrated in FIG. 8.

FIG. 9 is a diagram illustrating a configuration of pixels illustrated in FIG. 8. RS1 is a signal that resets the charge detectors (Cdfs) that convert electric charge accumulated in the respective PD_rs into voltage. RS2 is a signal that resets the charge detectors (Cdfs) that convert electric charge accumulated in the respective PD_gs into voltage. RS3 is a signal that resets the charge detectors (Cdfs) that convert electric charge accumulated in the respective PD_bs into voltage.

TS1 transmits electric charge accumulated in the PD_rs to the charge detectors (Cdfs) that convert the electric charge into voltage. TS2 transmits electric charge accumulated in the PD_gs to the charge detectors (Cdfs) that convert the electric charge into voltage. TS3 transmits electric charge accumulated in the PD_bs to the charge detectors (Cdfs) that convert the electric charge into voltage.

Analog signals (A_sig_r, A_sig_g, A_sig_b) obtained by converting electric charge into voltage at the pixblk_rs, the pixblk_gs, and the pixblk_bs are transferred to the ADCs in accordance with different transfer signals (ADTS1, ADTS2, ADTS3).

Although the image sensing device 20 and the image sensing device 30 have different configurations with respect to the pixel groups, the both perform parallel processing on the pixel groups including three pixels each. Thus, the image sensing device 20 and the image sensing device 30 both require the signals (RS, TS, ADTS) for each pixel in one pixel group. The signals (RS, TS, ADTS) are used in common among the pixel groups.

Figure 10:
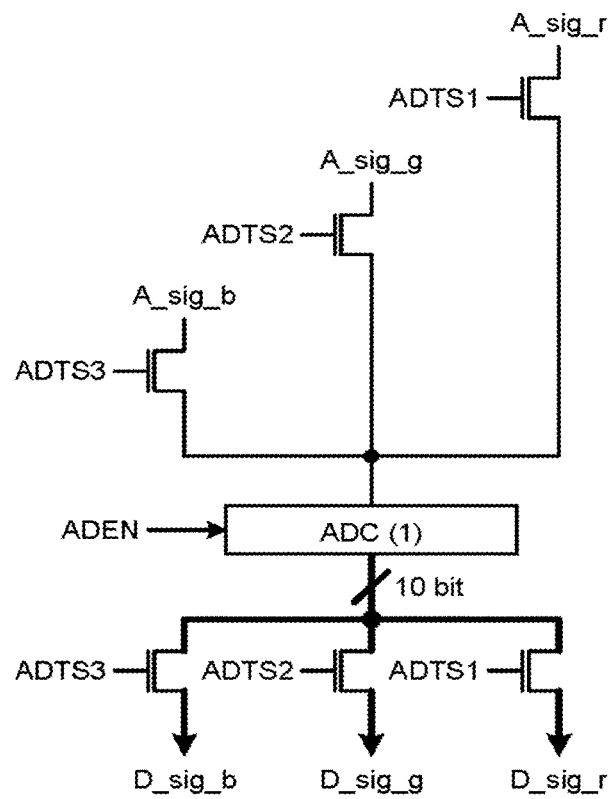
FIG. 10 is a diagram illustrating the periphery of an AD converter that converts analog signals output from the pixels illustrated in FIG. 8 into digital signals.

FIG. 10 is a diagram illustrating the periphery of an AD converter (ADC) that converts analog signals output from the pixels illustrated in FIG. 8 into digital signals. The analog signals (A_sig_r, A_sig_g, A_sig_b) output from the pixel 200, the pixel 202, and the pixel 204, respectively, are transferred to the corresponding ADC while the transfer signals (ADTS1, ADTS2, ADTS 3) with different transfer timings are high.

The analog image signals transferred to the ADC are converted into digital signals pixel by pixel while a signal ADEN that enables the ADC is high, and the digital signals (D_sig_r, D_sig_g, D_sig_b) are output to the parallel-serial converter 206 while the transfer signals (ADTS1, ADTS2, ADTS3) are high The timing at which the image sensing device 30 is driven is the same as that of the image sensing device 20 as illustrated in FIG. 6 (a different RGB color is processed because of the different configuration of the pixel groups).

Figure 11:
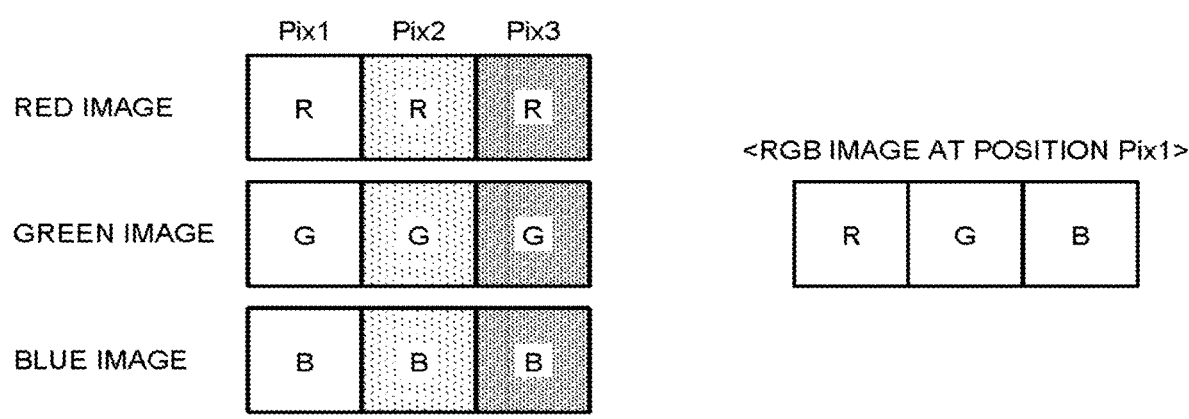
FIG. 11 is a schematic diagram illustrating colors of an image read and reproduced by the image sensing device.

FIG. 11 is a schematic diagram illustrating colors of an image read and reproduced by the image sensing device 30. As described above, each pixel group of the image sensing device 30 is composed of pixels in all colors configured to read a subject at the same position in a direction in which pixels in each color are arranged. Accordingly, the linearity of the ADCs is common (the same) whose effects appear on image data read by the pixels 200, the pixels 202, and the pixels 204 at the same position on a subject. In other words, the image sensing device 30 can prevent uneven color or false color from appearing that are caused by the fixed pattern noise in half tone that cannot be compensated by the black shading correction method or the white shading correction method.

Third Embodiment

Figure 12:
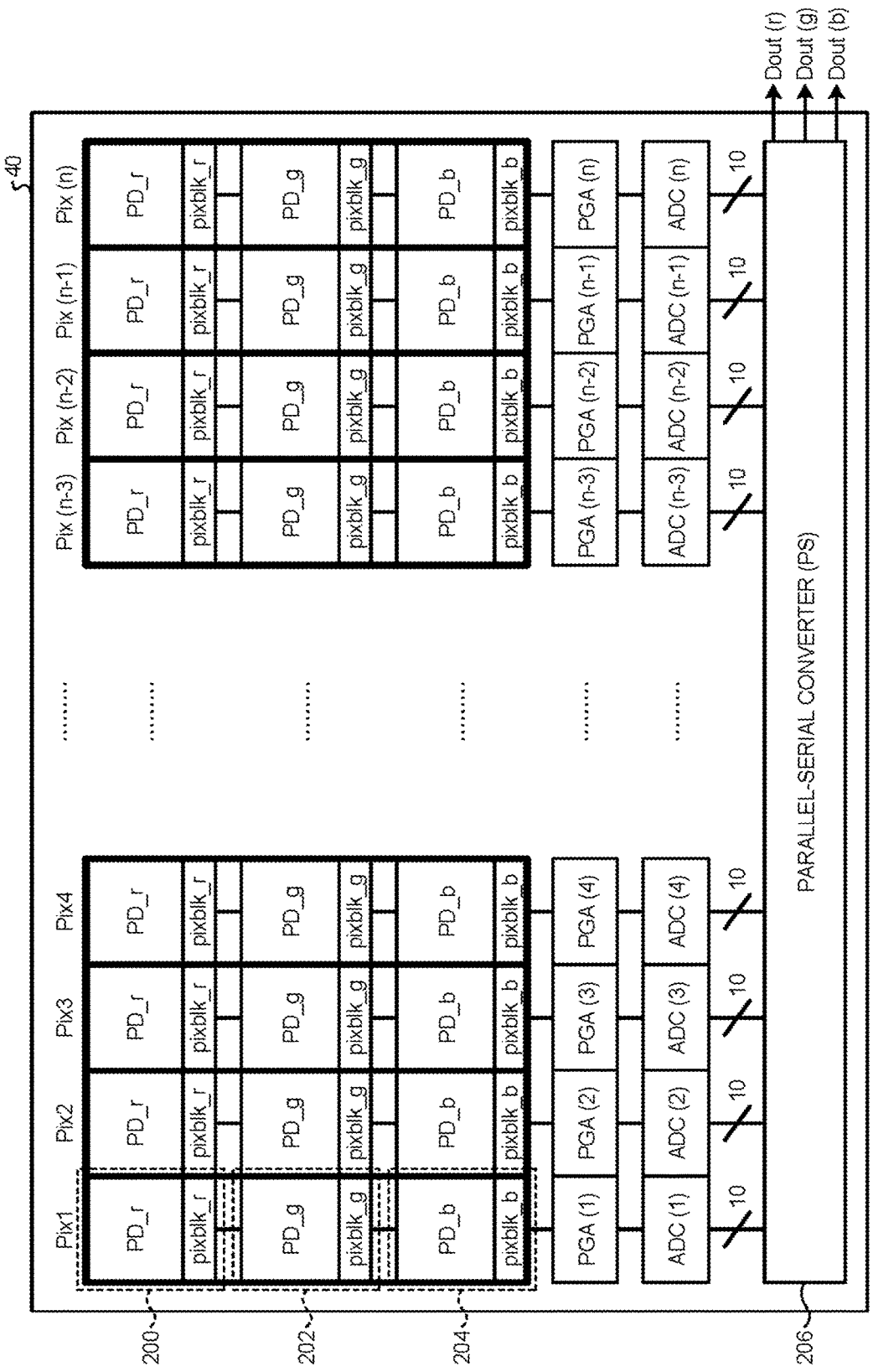
FIG. 12 is a diagram illustrating an example of a configuration outline of an image sensing device according to a third embodiment of the present invention.
Figure 13:
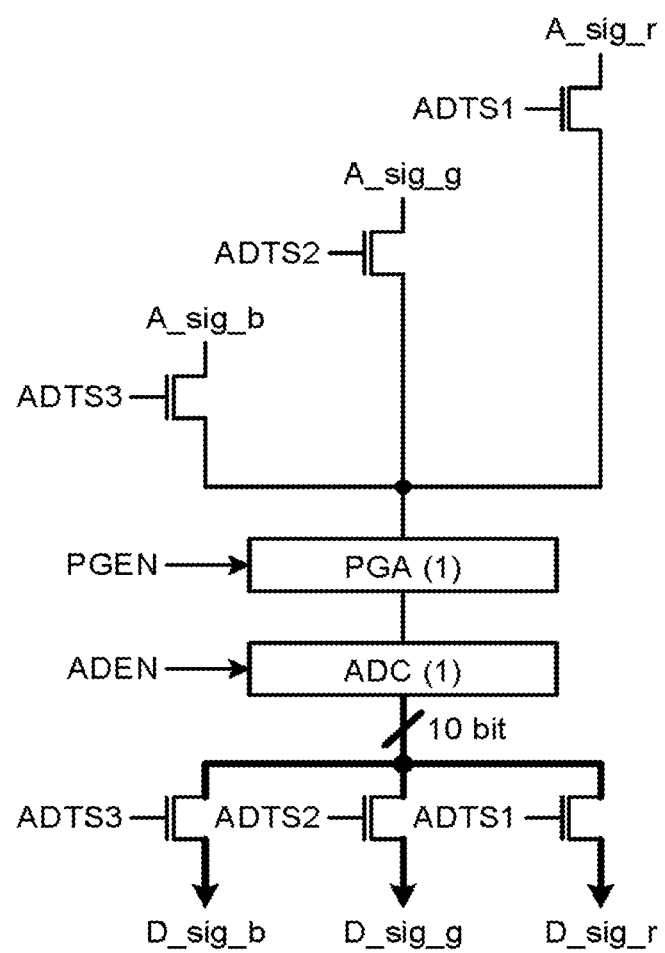
FIG. 13 is a diagram illustrating the periphery of an AD converter that converts analog signals output from pixels illustrated in FIG. 12 into digital signals.

Described next is an image sensing device according to a third embodiment in the present invention. FIG. 12 is a diagram illustrating an example of a configuration outline of an image sensing device 40 according to the third embodiment. FIG. 13 is a diagram illustrating the periphery of an AD converter (ADC) that converts analog signals output from the pixels illustrated in FIG. 12 into digital signals. The image sensing device 40 is configured such that programmable gain amplifiers (PGA) are provided at the preceding stages of the respective ADCs for the pixel groups of the image sensing device 30 illustrated in FIG. 8. Each PGA is configured to change the amplification factor for the PD_*s that constitute a pixel group. The PGAs amplify analog signals output from the pixels 200, the pixels 202, and the pixels 204, whereby the image sensing device 40 can use the dynamic range of the ADCs efficiently.

The PGAs may amplify the analog signals output from the pixels 200, the pixels 202, and the pixels 204 at different amplification factors. This configuration can optimize the dynamic range in each color even if the levels of analog signals are different for each RGB color.

Figure 14:
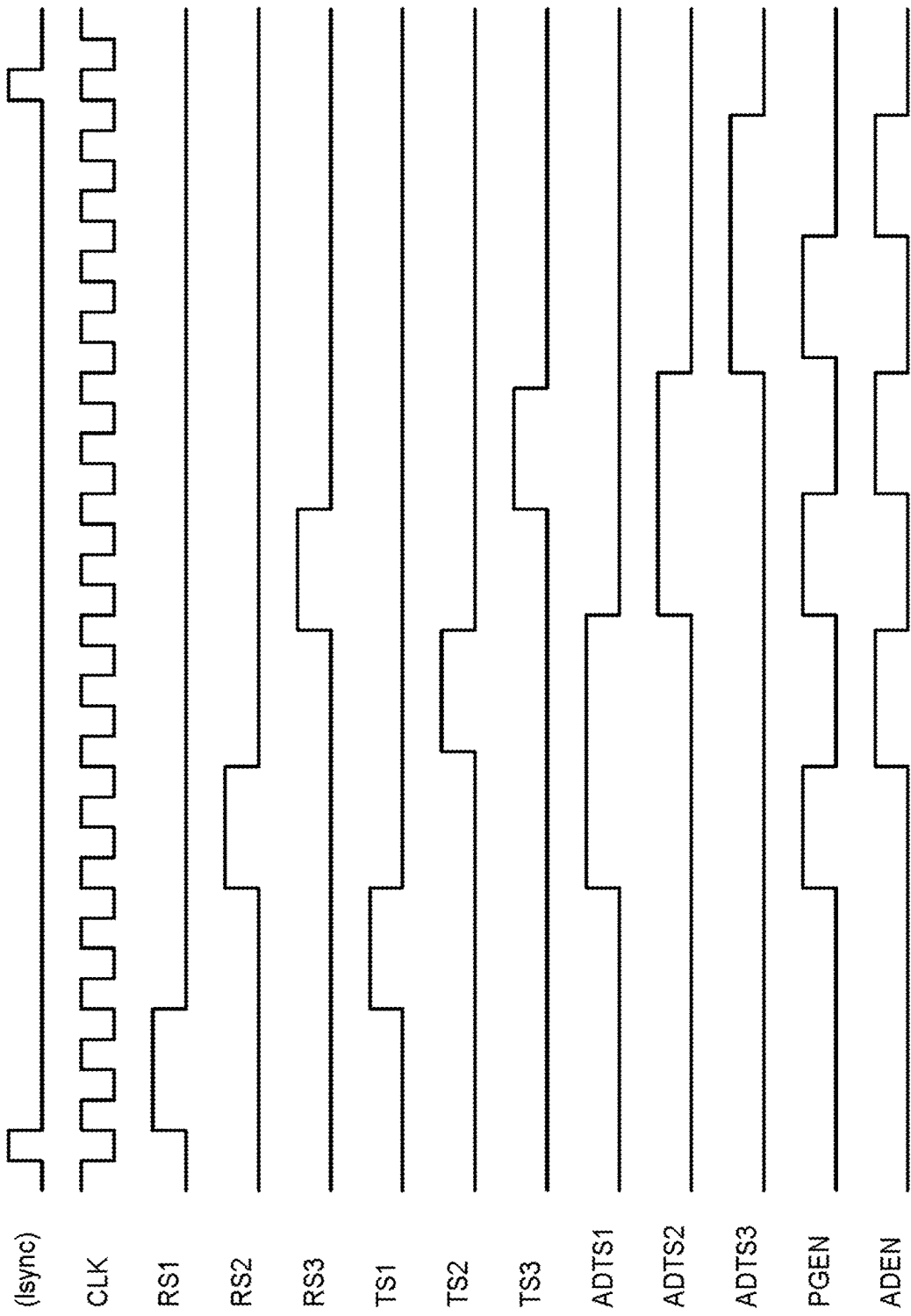
FIG. 14 is a timing chart illustrating operations for driving the image sensing device.

FIG. 14 is a timing chart illustrating operations for driving the image sensing device 40. Drive signals for the image sensing device 40 are generated by, for example, the timing generator 14 by using the reference clock (CLK) as in the case of the CMOS linear sensor 10 illustrated in FIG. 2. The image sensing device 40 is provided with the PGAs at the respective positions between the pixel groups and the ADCs.

Analog signals are transferred from the Cdfs to the PGAs while TS is high. The analog signals transferred to the PGAs are amplified while PGEN is high and are input to the ADCs. The amplified analog signals input to the ADCs are converted into digital signals while ADEN is high.

Fourth Embodiment

Figure 15:
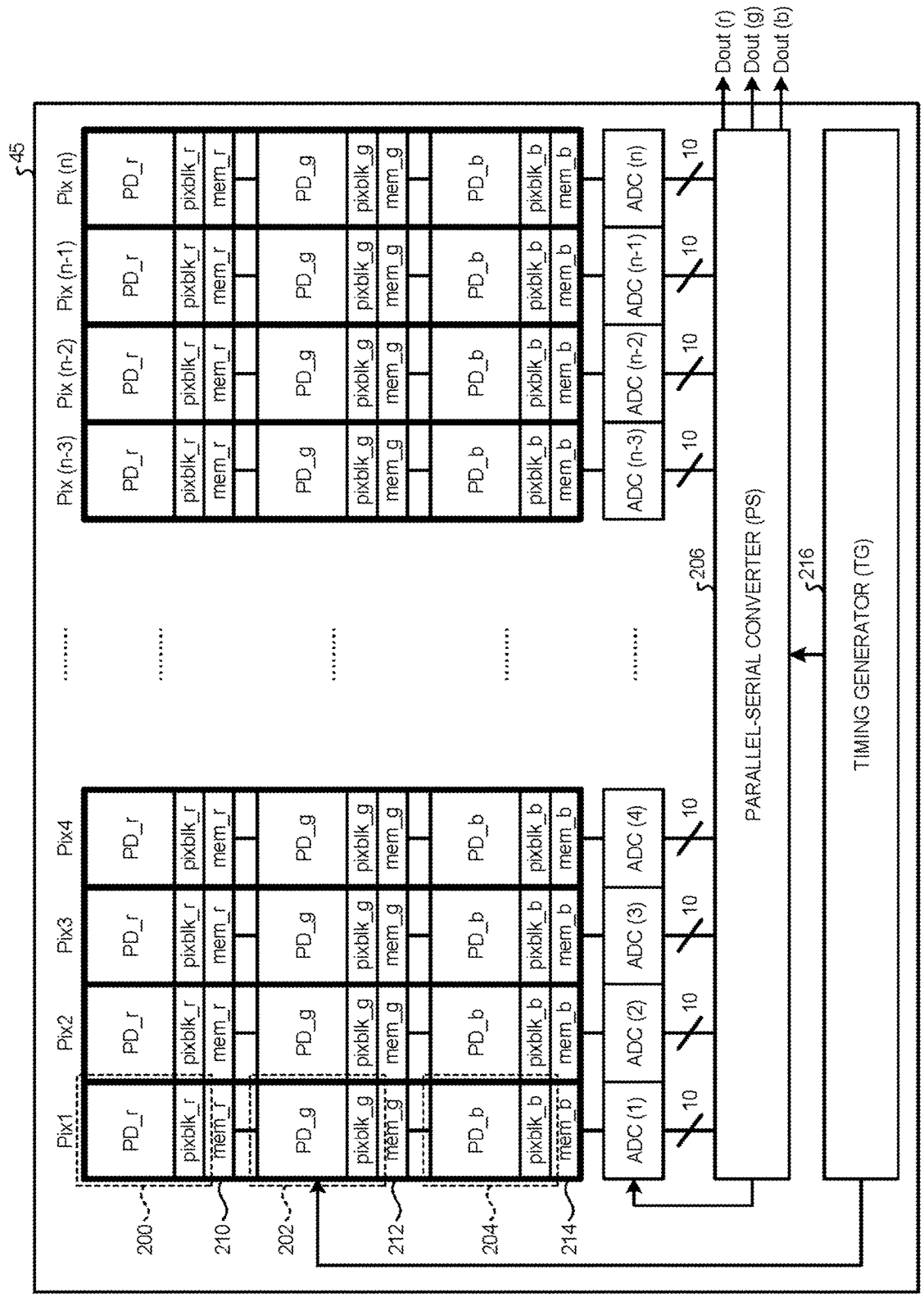
FIG. 15 is a diagram illustrating an example of a configuration outline of an image sensing device according to a fourth embodiment of the present invention.
Figure 16:
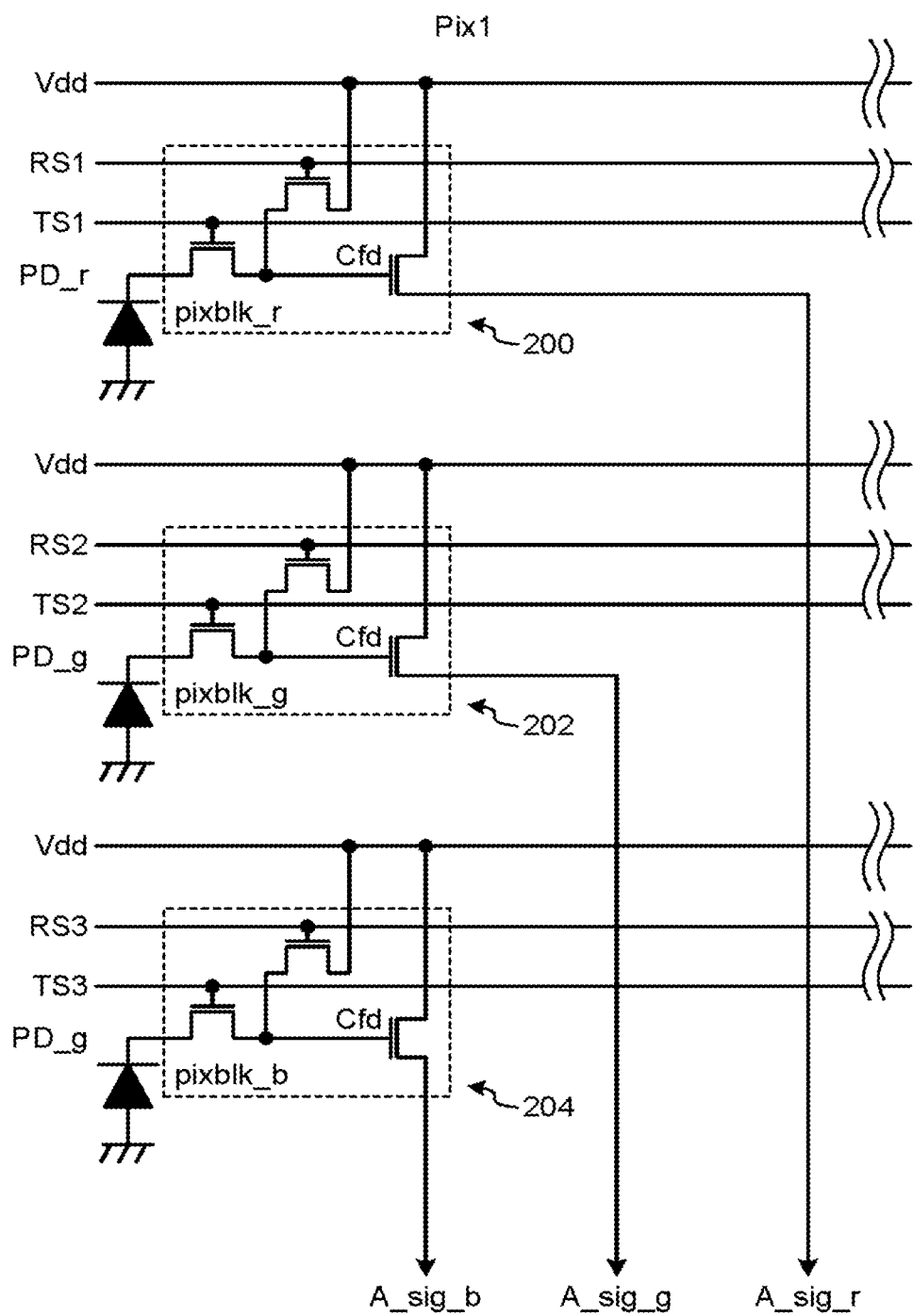
FIG. 16 is a diagram illustrating a configuration of pixels illustrated in FIG. 15.
Figure 17:
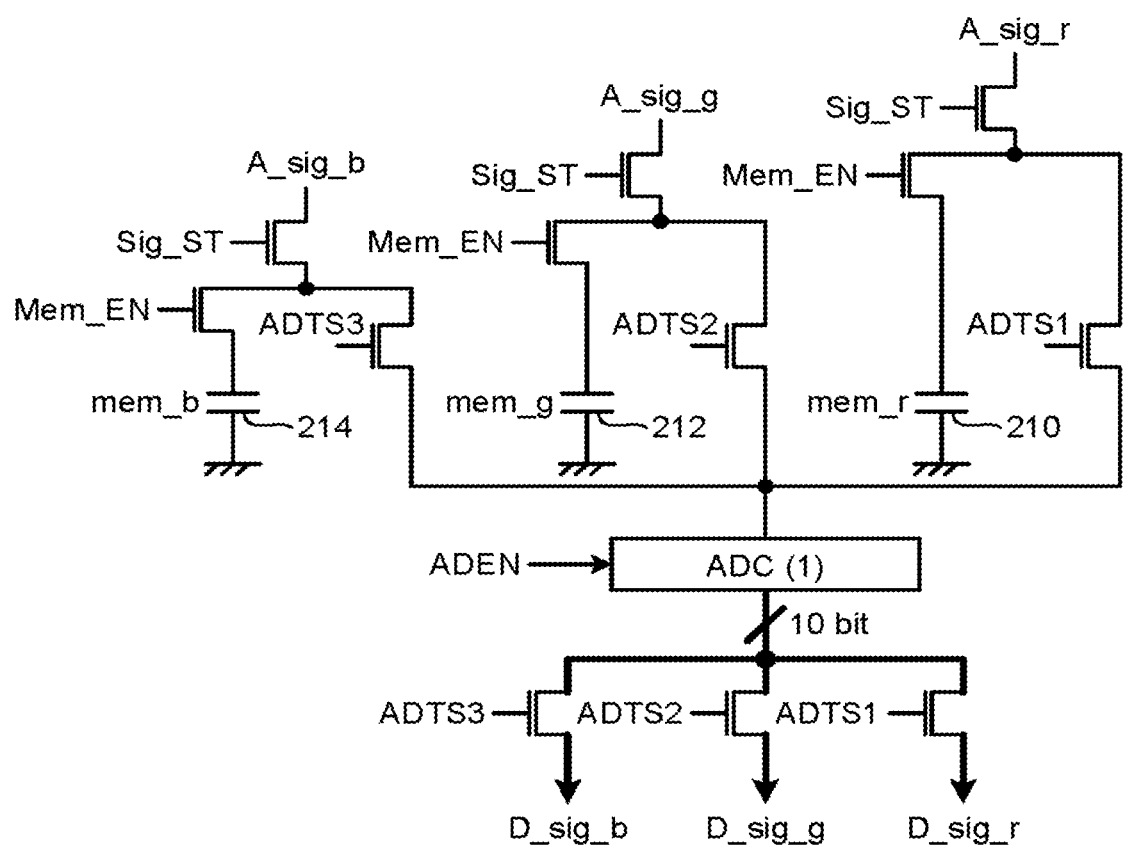
FIG. 17 is a diagram illustrating the periphery of an AD converter that convers analog signals output from the pixels illustrated in FIG. 15 into digital signals.

Described next is an image sensing device according to a fourth embodiment of the present invention. FIG. 15 is a diagram illustrating an example of a configuration outline of an image sensing device 45 according to the fourth embodiment. FIG. 16 is a diagram illustrating a configuration of the pixels illustrated in FIG. 15. FIG. 17 is a diagram illustrating the periphery of an AD converter (ADC) that converts analog signals output from the pixels illustrated in FIG. 15 into digital signals. The image sensing device 45 is configured such that analog memories (mem_rs) 210, analog memories (mem_gs) 212, and analog memories (mem_bs) 214 are provided for the respective pixels (the pixels 200, the pixels 202, and the pixels 204) of the image sensing device 30 illustrated in FIG. 8. The image sensing device 45 includes a timing generator (TG) 216 that has a function of controlling the analog memories 210, 212, and 214 to store therein outputs from the pixels in each pixel group in addition to the function that the timing generator 14 has.

Figure 18:
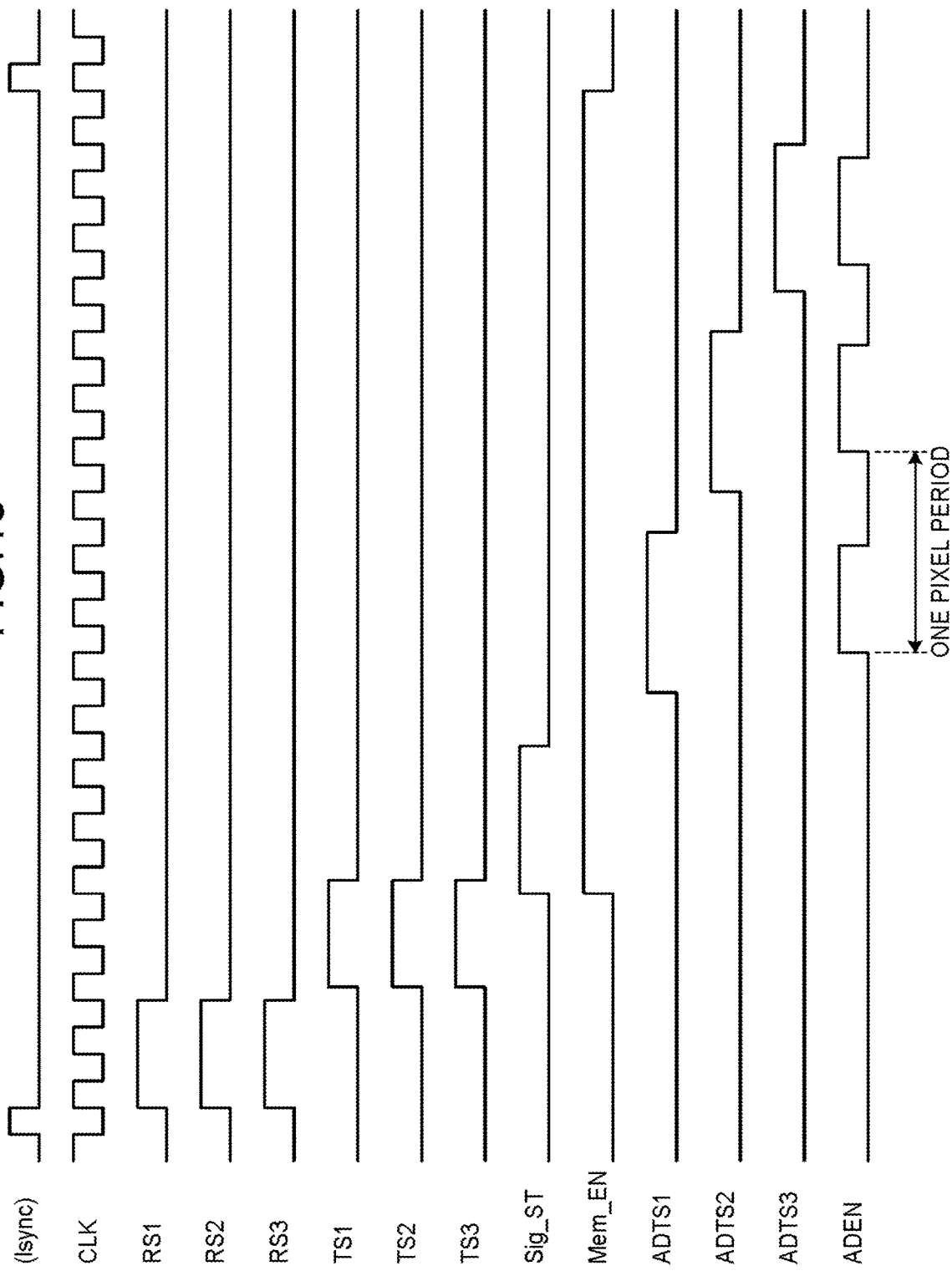
FIG. 18 is a timing chart illustrating operations for driving the image sensing device.

FIG. 18 is a timing chart illustrating operations for driving the image sensing device 45. Drive signals for driving each unit of the image sensing device 45 are generated by the timing generator 216. The image sensing device 45 stores image signals output from the pixels (the pixels 200, the pixels 202, the pixels 204) in the analog memories 210, 212, and 214, respectively, while a signal Sig_ST is high and a signal Mem_EM is high. In other words, the image sensing device 45 can store the analog signals A_sig_r, A_sig_g, and A_sig_b in the analog memories under the control of the timing generator 216, thereby achieving simultaneous exposure (global shutter) by which RGB pixels are exposed at the same timing. This configuration enables the image sensing device 45 to read the subject at the same position (pixel) in each color at the same time, thereby preventing color shift.

COMPARATIVE EXAMPLE

Figure 19:
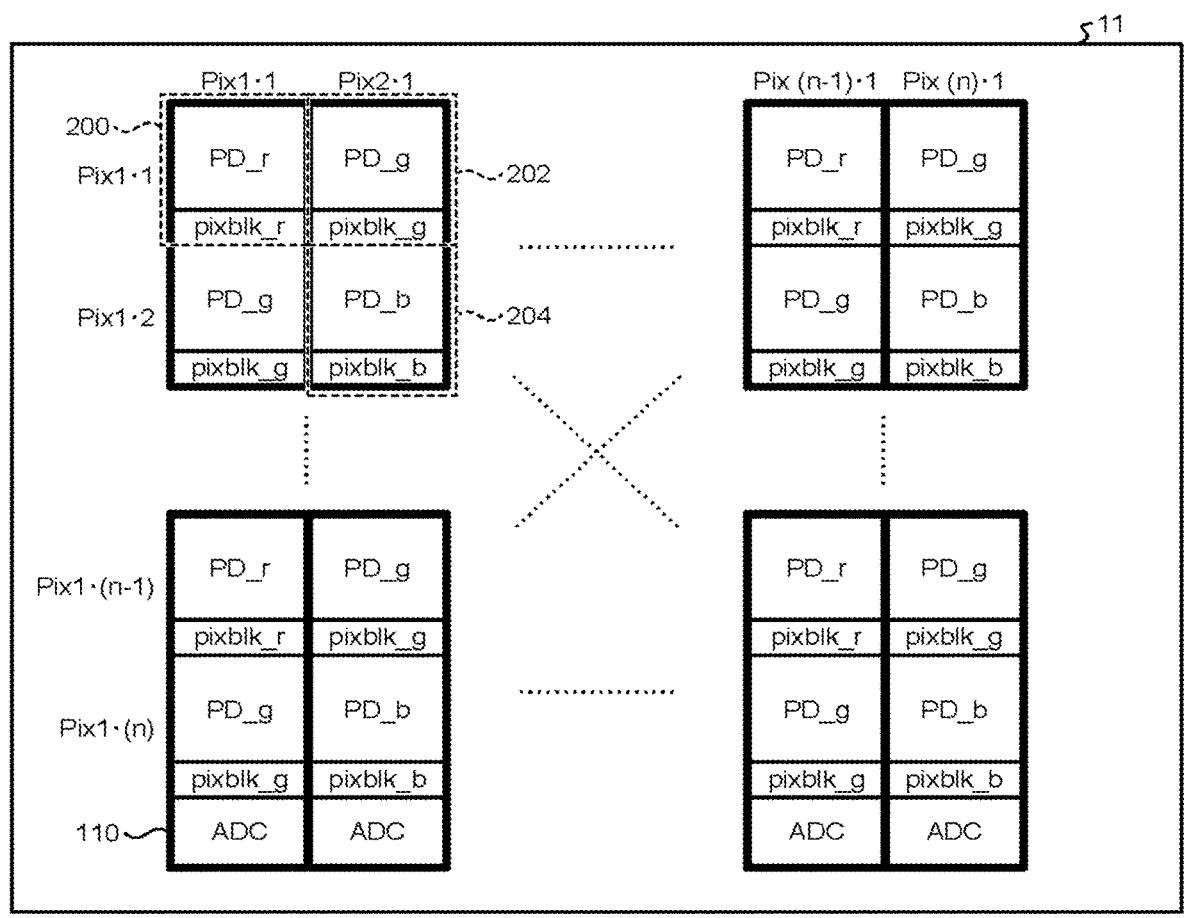
FIG. 19 is a diagram illustrating a configuration outline of a CMOS area sensor according to a comparative example.

Described next is a comparative example of an image sensing device. FIG. 19 is a diagram illustrating a configuration outline of a CMOS area sensor 11 according to the comparative example. The CMOS area sensor 11 includes the pixels 200, the pixels 202, and the pixels 204 that are arranged two-dimensionally (in the main-scanning direction and in the sub-scanning direction) to form, for example, the Bayer arrangement. The CMOS area sensor 11 includes an AD converter (ADC) 110 provided for each column, for example. FIG. 19 illustrates the CMOS area sensor 11, focusing on pixels and a processing circuit (ADC in the comparative example) that have different features from the CMOS linear sensor.

The CMOS area sensor 11 reads any one of R, G, and B colors as information per pixel (one pixel=one color) at the same position on a subject (the pixel position on the subject). Information on the other two colors needed for a pixel at the same position on the subject (the pixel position on the subject) is generated by an interpolation procedure using information on the peripheral pixels.

Even though the CMOS area sensor 11 uses one ADC in common for each pixel group including a plurality of pixels (for example, pixels in each column), because values of peripheral pixels using different ADCs are used in the interpolation procedure, uneven color or false color appears on an image due to different characteristics of the individual ADCs. For this reason, the effects of the embodiments described above are particular to the CMOS linear sensors.

Figure 20:
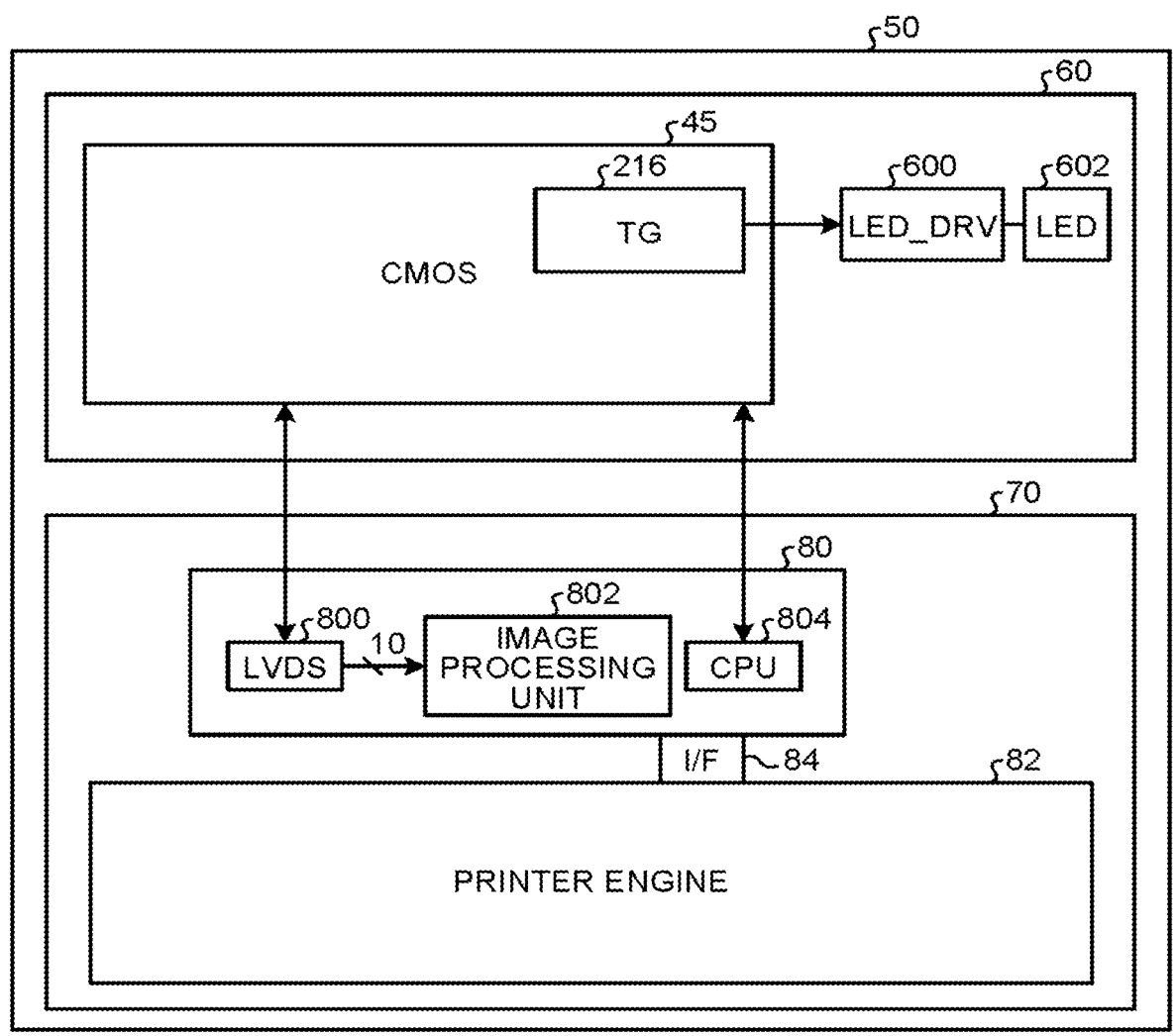
FIG. 20 is a diagram illustrating an outline of an image forming apparatus including an image reading device including, for example, an image sensing device.

Described next is an image forming apparatus provided with an image reading device including the image sensing device according to any one of the embodiments. FIG. 20 is a diagram illustrating an outline of an image forming apparatus 50 including an image reading device 60 including, for example, the image sensing device 45. The image forming apparatus 50 is, for example, a copier or a multifunction peripheral (MFP) including the image reading device 60 and an image forming unit 70.

The image reading device 60 includes, for example, the image sensing device 45, a light-emitting diode (LED) driver (LED_DRV) 600, and an LED 602. The LED driver 600 drives the LED 602 in synchronization with, for example, a line synchronization signal output from the timing generator (TG) 216. The LED 602 irradiates a document with light. In synchronization with the line synchronization signal, for example, the image sensing device 45 receives light reflected on the document and a plurality of PD_*s (not illustrated) generate electric charge and start accumulating it. After performing AD conversion and parallel-serial conversion, for example, the image sensing device 45 outputs the resulting image data to the image forming unit 70.

The image forming unit 70 includes a processing unit 80 and a printer engine 82. The processing unit 80 and the printer engine 82 are connected with each other via an interface (I/F) 84.

The processing unit 80 includes an LVDS 800, an image processing unit 802, and a central processing unit (CPU) 804. The CPU 804 controls units, such as the image sensing device 45, that constitute the image forming apparatus 50. The CPU 804 (or the timing generator 216) controls the PD_*s to start generating electric charge at substantially the same time in accordance with the amount of received light.

The image sensing device 45 outputs image data of an image read by, for example, the image reading device 60, the line synchronization signal, and a transmission clock to the LVDS 800. The LVDS 800 converts, for example, the received image data, line synchronization signal, and transmission clock into parallel 10 bit data. The image processing unit 802 performs image processing by using the converted 10 bit data, and outputs the resulting image data to the printer engine 82. The printer engine 82 prints a document by using the received image data.

As described above, the image sensing device according to any one of the embodiments includes an ADC that performs A/D conversion for each pixel group composed of a plurality of pixels and that is disposed in a position adjacent to the pixel group. This configuration can reduce wire resistance and wire capacitance along the analog bus, thereby enabling the image sensing device to read an image faster. In other words, the image sensing device according to any one of the embodiments can also reduce drive frequencies of analog signals.

According to the present embodiments, it is possible to achieve high-speed image reading.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image sensing device comprising:
a first plurality of photoelectric conversion elements arranged in one direction for each color of received light; and
an analog-to-digital (AD) converter that performs analog-to-digital conversion for each pixel group configured by a second plurality of photoelectric conversion elements for a same color selected from the first plurality of photoelectric conversion elements,
the AD converter being disposed in such a position that each pixel included in a pixel group of each of the second plurality of photoelectric conversion elements transmits a signal to the AD converter within a time period without falling behind the other pixels in the group, wherein
the AD converter is disposed at a position adjacent to each of the second plurality of photoelectric conversion elements configuring the pixel group.

2. The image sensing device according to claim 1, further comprising:
a controller that controls the second plurality of photoelectric conversion elements to simultaneously perform photoelectric conversion; and
a memory that stores results of the photoelectric conversion simultaneously performed by the second plurality of photoelectric conversion elements.

3. The image sensing device according to claim 1, further comprising:
an amplifier disposed at a preceding stage of the AD converter, the amplifier being configured to amplify a signal.

4. The image sensing device according to claim 3, wherein the amplifier is configured to change an amplification factor for each of the second plurality of photoelectric conversion elements configuring the pixel group.

5. An image reading device, comprising:
the image sensing device of claim 1.

6. The image sensing device according to claim 1, wherein
the first plurality of photoelectric conversion elements and the AD converter are disposed on the same chip.

7. An image forming apparatus comprising:
an image reading device that includes an image sensing device including
a first plurality of photoelectric conversion elements arranged in one direction for each color of received light,
an analog-to digital (AD) converter that performs analog-to-digital conversion for each pixel group configured by a second plurality of photoelectric conversion elements for a same color selected from the first plurality of photoelectric conversion elements,
the AD converter being disposed in such a position that each pixel included in a pixel group of each of the second plurality of photoelectric conversion elements transmits a signal to the AD converter within a time period without falling behind the other pixels in the group; and
circuitry configured to form an image read by the image reading device, wherein
the AD converter is disposed at a position adjacent to each of the second plurality of photoelectric conversion elements configuring the pixel group.

8. An image sensing method performed by an image sensing device comprising a first plurality of photoelectric conversion elements arranged in one direction for each color of received light, the method comprising:

performing, by an analog-to-digital (AD) converter, analog-to-digital conversion for each pixel group configured by a second plurality of photoelectric conversion elements for a same color selected from the first plurality of photoelectric conversion elements, the AD converter being disposed in such a position that each pixel included in a pixel group of each of the second plurality of photoelectric conversion elements transmits a signal to the AD converter within a time period without falling behind the other pixels in the group, wherein the AD converter is disposed at a position adjacent to each of the second plurality of photoelectric conversion elements configuring the pixel group.

9. An image sensing device comprising:

a first plurality of photoelectric conversion elements arranged in one direction for each color of received light; and an analog-to-digital (AD) converter that performs analog-to-digital conversion for each pixel group configured by a second plurality of photoelectric conversion elements for a same color selected from the first plurality of photoelectric conversion elements, the AD converter being disposed in such a position that each pixel included in a pixel group of each of the second plurality of photoelectric conversion elements transmits a signal to the AD converter within a time period without falling behind the other pixels in the group.

10. The image sensing device according to claim 9, further comprising:

a controller that controls the second plurality of photoelectric conversion elements to simultaneously perform photoelectric conversion; and a memory that stores results of the photoelectric conversion simultaneously performed by the second plurality of photoelectric conversion elements.

11. The image sensing device according to claim 9, further comprising:

an amplifier disposed at a preceding stage of the AD converter, the amplifier being configured to amplify a signal.

12. The image sensing device according to claim 11, wherein the amplifier is configured to change an amplification factor for each of the second plurality of photoelectric conversion elements configuring the pixel group.

13. An image reading device, comprising:

the image sensing device of claim 9.

14. The image sensing device according to claim 9, wherein the first plurality of photoelectric conversion elements and the AD converter are disposed on the same chip.

15. An image forming apparatus comprising:

an image reading device that includes an image sensing device including a first plurality of photoelectric conversion elements arranged in one direction for each color of received light, an analog-to-digital (AD) converter that performs analog-to-digital conversion for each pixel group configured by a second plurality of photoelectric conversion elements for a same color selected from the first plurality of photoelectric conversion elements, the AD converter being disposed in such a position that each pixel included in a pixel group of each of the second plurality of photoelectric conversion elements transmits a signal to the AD converter within a time period without falling behind the other pixels in the group; and circuitry configured to form an image read by the image reading device.

16. An image sensing method performed by an image sensing device comprising a first plurality of photoelectric conversion elements arranged in one direction for each color of received light, the method comprising:

performing, by an analog-to-digital (AD) converter, analog-to-digital conversion for each pixel group configured by a second plurality of photoelectric conversion elements for a same color selected from the first plurality of photoelectric conversion elements, the AD converter being disposed in such a position that each pixel included in a pixel group of each of the second plurality of photoelectric conversion elements transmits a signal to the AD converter within a time period without falling behind the other pixels in the group.

\* \* \* \* \*